April 17, 1951    G. W. MARSHALL ET AL    2,549,321
JACK ATTACHMENT FOR VEHICLES
Filed Jan. 28, 1948
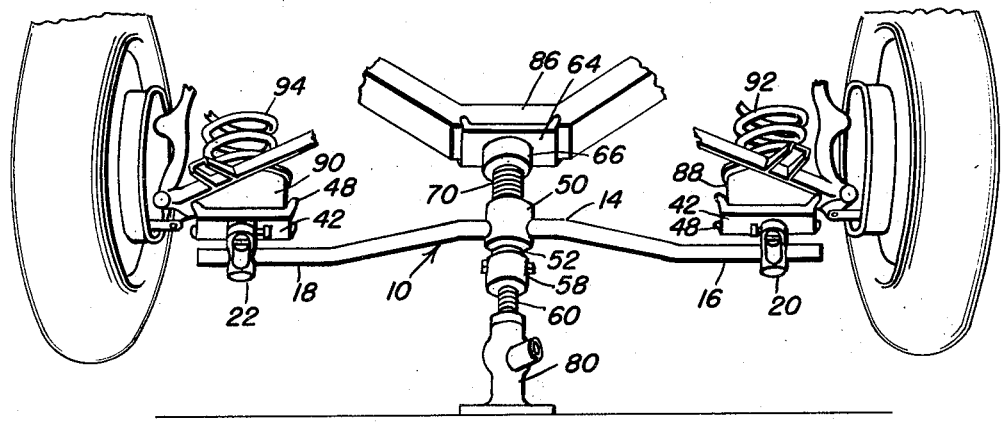
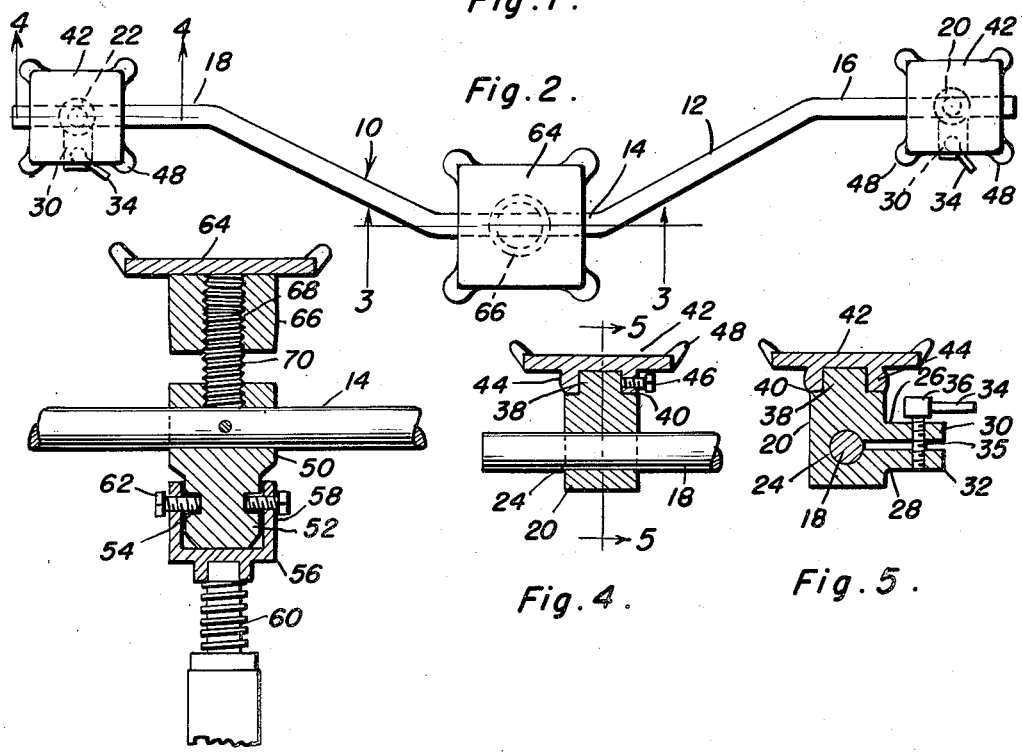
Gordon W. Marshall
John B. Scapiliati
INVENTORS Patented Apr. 17, 1951

2,549,321

UNITED STATES PATENT OFFICE 2,549,321

JACK ATTACHMENT FOR VEHICLES

Gordon W. Marshall, Dunellen, and John B. Scapiliati, North Plainfield, N. J.

Application January 28, 1948, Serial No. 4,808

4 Claims. (Cl. 254—134)

This invention relates to a hoist attachment for raising and supporting in a selected raised position the front and rear end assembly of a vehicle to enable a mechanic or the like to inspect the undercarriage structure and effect repairs thereon and relates particularly to an attachment for a customary conventional jack.

The principal object of this invention is to securely and efficiently support a car, regardless of the understructure thereof, in a secure raised position to obviate any possibility of the car coming unseated from the hoisting apparatus and dropping to the ground.

A further object of this invention is to securely and efficiently raise and support in a raised position a vehicle regardless of the wheel base or gauge of the car.

Another object of this invention is to provide an efficient and durable hoist attachment, that can be easily and conveniently attached to a customary conventional movable automobile jack, and which will be efficient and durable in operation.

With these and ancillary objects in view, this invention comprises certain novel features and arrangement of parts, as will become more apparent, as the following description proceeds, in view of the accompanying drawings, wherein:

Figure 1 is a perspective view of an attachment for a conventional jack, constructed according to the principles of this invention, and shown in use, as supporting a vehicle in raised position;

Figure 2 is a top plan view of the attachment for a jack;

Figure 3 is a transverse sectional view taken substantially on the plane of the line 3—3 of Figure 2;

Figure 4 is a transverse sectional view taken substantially on the line 4—4 of Figure 2, and;

Figure 5 is a vertical sectional view, taken substantially on the plane of line 5—5 of Figure 4.

This invention refers to a hoist attachment for raising and supporting in raised position a front or rear end assembly of a vehicle, regardless of the make or structure of the vehicle. Motor vehicles are now being manufactured, with the crosswise supporting axle for the front and rear wheels disregarded and the vehicles are customarily being equipped with what is commonly referred to as knee action suspension, wherein the wheels are separately attached to the chassis by a linkage system enabling the wheels to define a separate vertical motion. A conventional movable automobile jack inserted under the chassis would not be efficient, since having no axle to raise, which would raise the wheels in unison, the jack would support and raise the chassis, which would expand the individual springs on the wheels. Thus, the primary object of this invention is to provide an attachment for a customary jack that will engage and raise a knee action type automobile, either the spring cup type or the free axle type, so that the chassis and wheels will be proportionately and equally raised from the ground, with the wheel springs compressed. Also, since various types of motor vehicles are being constructed, which have their wheels positioned at various gauges or define dissimilar wheel bases, it is an equally important purpose of this invention to provide an attachment for a customary jack, comprising a longitudinally extending support bar, with adjustable support plates positioned on the projecting or extending ends thereof, so that the support plates, which seat and support the suspension springs of the motor vehicle, can be longitudinally adjusted relative to the center or ends of the support bar, for accommodating a motor vehicle, regardless of the wheel base thereof.

Referring now more particularly to the drawings, wherein similar characters of reference designate corresponding parts throughout, and wherein a preferred embodiment of this invention is illustrated by way of example only, there is shown and described a hoist attachment, for use in association with the customary jack, said hoist attachment being designated by the reference character 10. The hoist attachment comprises an elongated longitudinally extending support bar 12, having a medial arcuate or U-shaped section 14, with end extensions 16 and 18 diverging or projecting outwardly therefrom. The end extensions 16 and 18 form oppositely extending arms for the arcuate or U-shaped medial section 14.

Disposed on the end extensions 16 and 18 of the bar 12 are plate supporting collars 20 and 22, respectively, of a similar structure. The collars 20 and 22 are formed of a suitable sturdy metallic material or the like and generally oval in configuration. The collars 20 and 22, which may be of any suitable shape, are shown as cylindrical and have transversely disposed therein a bore or opening 24, within which is inserted the end extensions 16 and 18 of the support bar 12. The collars 20 and 22 have a longitudinally extending split opening formed in the side walls thereof defining clamping jaws 26 and 28 in conjunction with offset perforated ears 30 and 32, which are formed integrally with the side wall and project laterally therefrom. Suitable means are provided to move the clamping jaws 26 and 28 of the collars 20 and 22, respectively, into clamping engagement or apart and comprise a threaded shank 35, which is threadedly received within the perforations of the perforated ears 30 and 32, the former being smoothly bored while the latter are internally threaded. A handle member 34 integrally formed at one end with a collar 36, within which one end of the threaded shank 35 is received, is employed to rotate the threaded shank 35 within the perforations of the ears 30 and 32 and to thereby move the jaws 26 and 28 into or out of engagement, whereby the collars 20 and 22 may be secured to the end extensions and slidably adjusted thereon relative to the arcuate medial section thereof. Disposed on the top of the collars 20 and 22 and upraised therefrom and integral therewith is a head portion 38 of a smaller diameter than the collars 20 and 22, which thereby defines seats 40 on the perimeter of the upper surface. A rotatably mounted support plate, which engages the spring cups or the like of the knee action type suspension vehicle system is seated on the upstanding head portion 38 and has a depending circular flange 44 forming a socket to receive the shoulder portion 40 defined by the indenting of the head portion 38 on the collars 20 and 22. Suitable means are provided to limit the rotation of the support plates and to lock them in a selected angular position and comprises a set screw or bolt 46, which is disposed in a transversely disposed threaded bore formed in the depending flange 44 so that the end of the set screw or bolt engages the side wall of the head portion 38. Upstanding from the angular corner junctions of the support plate 42 are guide flanges 48, which serve to limit the lateral movement of an axle, of a motor-type vehicle and the lateral movement of a spring supporting cup, of the knee action type vehicle.

Securely disposed on the medial portion of the arcuate section or substantially U-shaped portion 14 of the support bar is a cylindrical spacing block 50, having a bore or opening formed therethrough, whereby the support bar is disposed therethrough. The cylindrical side walls of the spacing block 50 depend downwardly and inwardly, defining a depending jack attaching pin 52. The depending pin 52, formed integrally with the spacking block 50, has a pair of oppositely disposed inwardly projecting internally threaded bores 54. The terminus of the depending connecting pin portion 52 is seated within a cup 56, having an upstanding circular flange section 58. The cup 56 is suitably secured to the pushing arm or raising arm 60 of a customary conventional jack. Set screws or bolts 62 are disposed through apertures formed in the upstanding flange 58 and seat within the opposing bores 54 on the side walls of the depending pin section 52, thereby securing the spacing block to the pushing or lifting arm 60 of the jack. A support plate 64 of a suitable construction and size, preferably rectangular or square in shape, and similar though larger in area to the end support plates 42 is received in the upstanding portion of the spacing block 50. The support plate 64 has a depending integrally formed collar 66, having a centrally disposed exteriorly threaded bore 68 disposed therein, within which is threaded an exteriorly threaded shank or rod 70, having its opposite end seated in an exteriorly threaded bore centrally disposed in the upper portion of the spacing block 50. Thus, the support plate 64 is vertically adjustable on the threaded shank or rod 70 to be raised or lowered to the desired position thereby, dependent upon the height of the chassis of the motor vehicle.

Referring now particularly to Figure 1 of the drawings, the hoist attachment 10 is shown secured to the conventional movable automobile jack 80, with the support plate 64 positioned under and supporting the chassis 86 of an automobile and the support plates 42 seated on the collars 20 and 22 on the extending ends 16 and 18, supporting the spring cups 88 and 90, within which is supported and seated the helical springs 92 and 94. Thus, from consideration of the jack attachment, as shown in operative position with the front wheel assembly of an automobile, in Figure 1, it can be seen that the support plates 42 oppositely disposed on the support bar 12 are longitudinally adjustable thereon and also swivelly mounted to the clamping collars 20 and 22. The main support plate 64, which supports the chassis 86, is vertically adjustable on the threaded shank 70 and is also swivelly mounted thereon.

Thus, when a car is desired to be hoisted, the jack and the attachment is inserted under the wheel assembly and the center support plate 64 is vertically adjusted on the threaded shank 70 until the jack abuts against the chassis 86, the oppositely extending support plates 42 are then positioned by means of the clamping collars on the end extensions 16 and 18 of the support bar under the spring cups or the other knee action suspension structure. The jack 80 is then employed and the hoist attachment provides an even and proportionate raising of the wheel assembly and the front or rear end of the vehicle.

Also, the plates 42 by being swivelly adjusted are capable of supporting the older-type crosswise axle-type construction, as well as the newer knee action type.

Since many other objectives and modifications of this device will become apparent to those skilled in the art upon a perusal of the description, in view of the accompanying drawings, it is to be understood that certain changes in size, style and structure may be effected without a departure from the spirit of the invention and within the scope of the appended claims.

Having described the invention, what is claimed as new is:

1. An accessory for an automobile jack comprising a humped central portion, and opposing end sections disposed in the same horizontal plane below the humped portion, collars slidably disposed on the end sections, means for locking the collars in a desired position, support plates rotatably mounted on the collars, means for locking the plates in a desired position, a collar disposed on said humped portion, means for attaching said collar to the lifting head of a jack and means supported by said collar for engaging the frame of a vehicle, said last means being vertically adjustable with respect to said collar.

2. An accessory for an automobile jack comprising a supporting bar having an arcuate center section and end sections disposed in the same horizontal plane below the center section, collars slidably disposed on the end sections, means for locking said collars on the end sections, support plates rotatably mounted on the upper portions of the collars, means for locking said plates in a desired position, a collar fixed on the center section, means for securely seating said collar on the lifting head of a jack, an exteriorly threaded rod vertically supported by said collar, a supporting plate adjustably mounted on the upper end of the rod.

3. An accessory for a jack comprising a supporting beam having an inverted U-shaped center section, end sections extending in opposite directions from the U-shaped section and disposed in the same horizontal plane below the center section, collars slidably disposed on the end sections, means carried by the collars for locking the same on the end sections, reduced heads on said collars, supporting plates, depending sockets on said plates rotatably mounted on said heads, means for locking said sockets on the heads, a collar fixed on the center section, means connecting said collar to the lifting head of a jack and means supported by said collar for engaging the frame of a vehicle.

4. An accessory for a jack comprising a supporting beam having an inverted U-shaped center section, end sections extending in opposite directions and disposed in the same horizontal plane below the center section, split collars slidably disposed on the end sections, locking means associated with said collars for securing the same in adjusted positions with respect to the center section, bearing portions on the upper sections of the collars, supporting plates rotatably disposed on the bearing portions, means carried by said plates for frictionally locking the same on the bearing portions, a collar fixed on said center section, a depending portion on said collar, a coupling member clamped on the depending portion and engageable on the lifting head of a jack, an exteriorly threaded shank supported by said collar, a supporting plate adjustably mounted on the upper end of the shank.

GORDON W. MARSHALL.
JOHN B. SCAPILIATI.

REFERENCES CITED

The following references are of record in the file of this patent:

UNITED STATES PATENTS

| Number | Name | Date |
|---|---|---|
| 1,260,030 | Perkins | Mar. 19, 1918 |
| 1,283,795 | Kelly | Nov. 5, 1918 |
| 1,847,719 | Hirschel | Mar. 1, 1932 |
| 1,909,023 | Statz | May 16, 1933 |
| 1,978,471 | Mizer et al. | Oct. 30, 1934 |
| 2,012,430 | Kuhlman | Aug. 27, 1935 |